(12) United States Patent
Nakamura

(10) Patent No.: US 9,582,094 B2
(45) Date of Patent: Feb. 28, 2017

(54) INFORMATION PROCESSING DEVICE, DISPLAY DEVICE WITH TOUCH PANEL, INFORMATION PROCESSING METHOD, AND PROGRAM

(71) Applicant: Sharp Kabushiki Kaisha, Osaka-shi, Osaka (JP)

(72) Inventor: Yasuhiro Nakamura, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 97 days.

(21) Appl. No.: 14/646,035

(22) PCT Filed: Feb. 12, 2014

(86) PCT No.: PCT/JP2014/053191
§ 371 (c)(1),
(2) Date: May 20, 2015

(87) PCT Pub. No.: WO2014/141797
PCT Pub. Date: Sep. 18, 2014

(65) Prior Publication Data
US 2015/0301633 A1    Oct. 22, 2015

(30) Foreign Application Priority Data

Mar. 14, 2013 (JP) ................................. 2013-052435

(51) Int. Cl.
*G06F 3/041* (2006.01)
*G06F 3/0488* (2013.01)
(Continued)

(52) U.S. Cl.
CPC ............. *G06F 3/041* (2013.01); *G06F 3/0416* (2013.01); *G06F 3/0488* (2013.01); *G06F 3/04883* (2013.01); *G06F 3/14* (2013.01); *H04M 1/72583* (2013.01); *H04M 11/007* (2013.01); *G06F 2203/04101* (2013.01)

(58) Field of Classification Search
CPC .... G06F 3/041; G06F 3/04883; G06F 3/0416; G06F 3/14; G06F 3/0488; G06F 2203/04101; H04M 1/72583; H04M 11/007
See application file for complete search history.

(56) References Cited

U.S. PATENT DOCUMENTS

2009/0288044 A1   11/2009   Matthews et al.
2011/0157014 A1    6/2011   Hachiya et al.
(Continued)

FOREIGN PATENT DOCUMENTS

JP    2011-134278 A    7/2011
JP    2011-521381 A    7/2011
(Continued)

OTHER PUBLICATIONS

Official Communication issued in International Patent Application No. PCT/JP2014/053191, mailed on Apr. 28, 2014.

*Primary Examiner* — Premal Patel
(74) *Attorney, Agent, or Firm* — Keating & Bennett, LLP

(57) ABSTRACT

An information processing device includes: an operation type judgment unit that judges a type of touch operation, based on information representing a number of pixels per unit length of a screen of a display with a touch panel connected to an own device and on information indicating a touch position at which the display with the touch panel was touched.

4 Claims, 7 Drawing Sheets

(51) Int. Cl.
    *G06F 3/14*           (2006.01)
    *H04M 1/725*        (2006.01)
    *H04M 11/00*       (2006.01)

(56) References Cited

U.S. PATENT DOCUMENTS

| | | |
|---|---|---|
| 2012/0194456 A1 | 8/2012 | Fujii et al. |
| 2013/0033435 A1* | 2/2013 | Raveendran .......... G06F 3/0481 345/173 |

FOREIGN PATENT DOCUMENTS

| | | |
|---|---|---|
| JP | 2012-127791 A | 7/2012 |
| JP | 2012-155590 A | 8/2012 |
| JP | 5331935 B1 | 10/2013 |
| JP | 2013-254435 A | 12/2013 |

\* cited by examiner

FIG. 4

| COORDINATE DETECTION TIMES | COORDINATES | |
|---|---|---|
| | dx | dy |
| 20130204153101235-dt | null | null |
| 20130204153101235 | dx_1 | dy_1 |
| 20130204153101235+dt | dx_1 | dy_1 |
| 20130204153101235+2dt | null | null | t101t, t100t, t102t

FIG. 5

| COORDINATE DETECTION TIMES | COORDINATES | |
|---|---|---|
| | dx | dy |
| 20130204153101245-dt | null | null |
| 20130204153101245 | dx_2 | dy_2 |
| 20130204153101245+dt | dx_3 | dy_3 |
| 20130204153101245+2dt | dx_4 | dy_4 |
| 20130204153101245+3dt | dx_5 | dy_5 |
| 20130204153101245+4dt | null | null | t101f, t100f, t102f

INFORMATION PROCESSING DEVICE, DISPLAY DEVICE WITH TOUCH PANEL, INFORMATION PROCESSING METHOD, AND PROGRAM

TECHNICAL FIELD

The present invention relates to an information processing device, a display device with touch panel an information processing method, and a program.

The subject application claims priority based on the patent application No. 2013-052435 filed in Japan on Mar. 14, 2013 and incorporates by reference herein the content thereof.

BACKGROUND ART

Because portability is important in mobile terminals such as mobile telephone handsets, the size of display devices, such as liquid crystal displays is limited. Given this, there have been a mobile terminal connecting to an external display device and causing the display of an image generated thereby. As part of this situation, there has been a case in which, when a device having a touch panel as an external display is connected to a mobile terminal having a display of a different size, operation is possible from both the mobile terminal and the external display, with a device having one touch panel.

For example, Patent Document 1 discloses a technique for the purpose of operating an external display with a touch panel connected to a mobile terminal from the touch panel of the mobile terminal itself (refer to Patent Document 1).

PRIOR ART DOCUMENT

Patent Document

[Patent Document 1] Japanese Unexamined Patent Application Publication No. 2011-134278

SUMMARY OF THE INVENTION

Problem to be Solved by the Invention

In the mobile terminal described in Patent Document 1, depending upon the size of the connected display with a touch panel, there has been a problem of not being able to properly judge the type of touch operation. For example, a touch operation judged by a 5-inch display with a touch panel to be a flick is judged by a 10-inch display with a touch panel to be a tap.

Given this, an aspect of the present invention has been made in consideration of the above-described conventional problem and provides an information processing device, a display with touch panel, an information processing method, and a program capable of properly judging the type of touch operation made on a display with a touch panel connected to the information processing device.

Means to Solve the Problem

The present invention is made to solve the above-described problem, and one aspect of the present invention is an information processing device including: an operation type judgment unit that judges a type of touch operation, based on information representing a number of pixels per unit length of a screen of a display with a touch panel connected to an own device and on information indicating a touch position at which the display with the touch panel was touched.

Effect of the Invention

An aspect of the present invention provides an information processing device, a display device with touch panel, an information processing method, and a program capable of properly judging the type of touch operation made on a display device with a touch panel connected to the information processing device.

BRIEF DESCRIPTION OF THE DRAWINGS

FIG. 4 is a table showing an example of a touch operation table for the case in which the display with touch panel 200 is tapped in the first embodiment.

FIG. 5 is a table showing an example of a touch operation table for the case in which the display with touch panel 200 is flicked in the first embodiment.

EMBODIMENT FOR CARRYING OUT THE INVENTION

First Embodiment

The first embodiment of the present invention will be described below, with references being made to the drawings.

Figure 1:
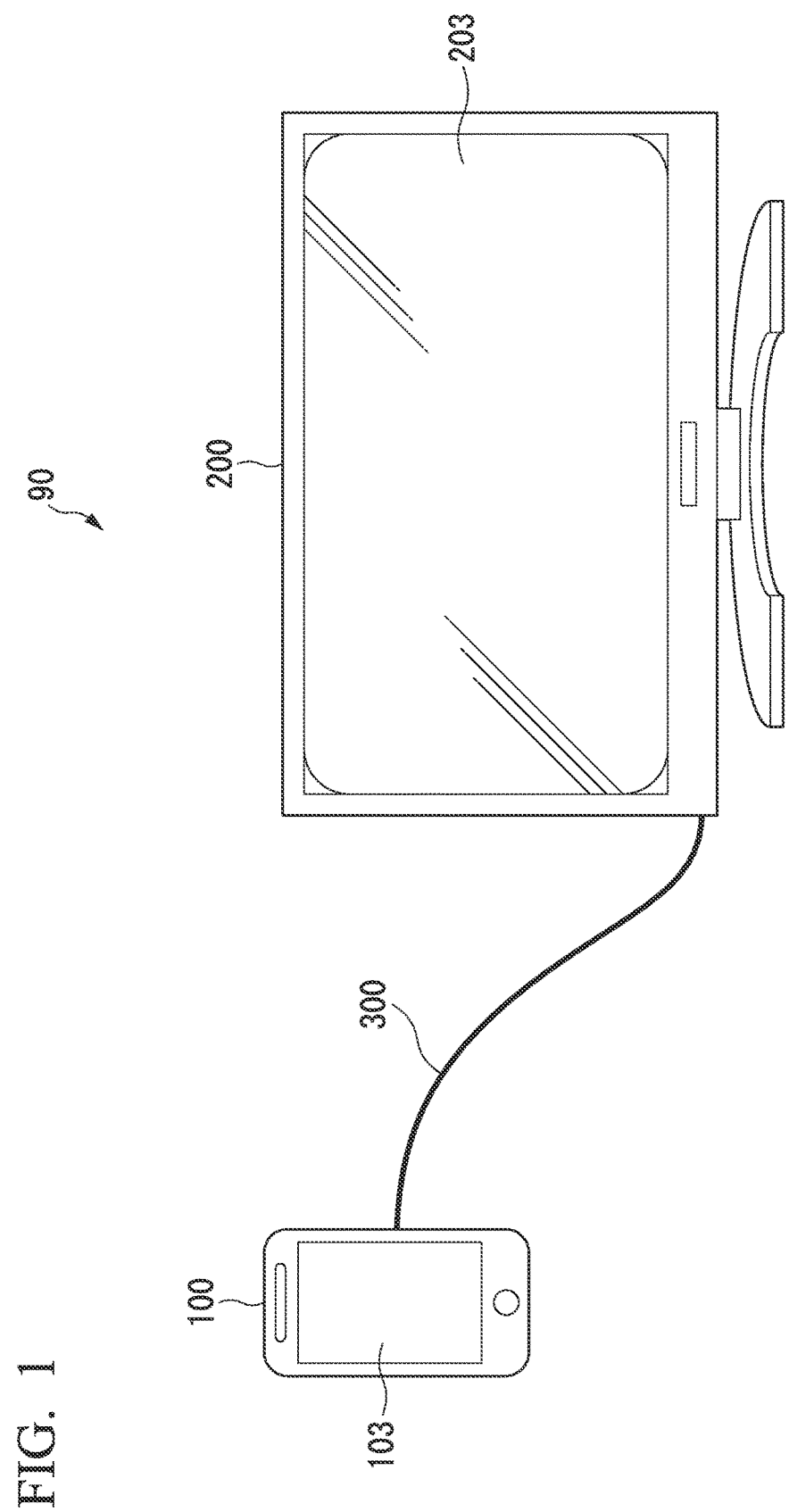
FIG. 1 is an outer view showing the condition in which an information processing device 100 according to an embodiment of the present invention is used.

FIG. 1 is an outer view 90 showing the condition in which the information processing device 100 according to the first embodiment of the present invention is used. The information processing device 100 according to the present embodiment is an information processing device such as a smartphone or a tablet terminal. The information processing device 100, as will be described later, has a first touch panel 103 and a first display unit 102, displays an image on the first display unit 102, and detects a touch position on the first touch panel 103. Additionally, when the display with touch panel 200 is connected to the information processing device 100 by a cable 300, as shown in FIG. 1, an image is displayed on the display with touch panel 200 and the touch position on the display with touch panel 200 is obtained.

In the present embodiment, the information processing device 100 has connected thereto the display with touch panel 200, an image being displayed on the display with touch panel 200 and the touch position being detected from this device at all times. As another embodiment, the display with touch panel 200 is connected to the information processing device 100 and an image may be displayed on the display with touch panel 200 and the touch position may be detected from the device only when a user makes an instruction operation.

Although FIG. 1 shows the case in which the information processing device 100 and the display with touch panel 200 are connected by one cable 300, they may be connected by a plurality of cables, or connected by wireless communication. Also, the image data displayed on the display with touch panel 200 may be sent by cable to the display with touch panel 200 and information indicating the touch position detected by the display with touch panel 200 may be transmitted by a different communication means, such as transmitting it to the information processing device 100 by wireless communication.

Figure 2:
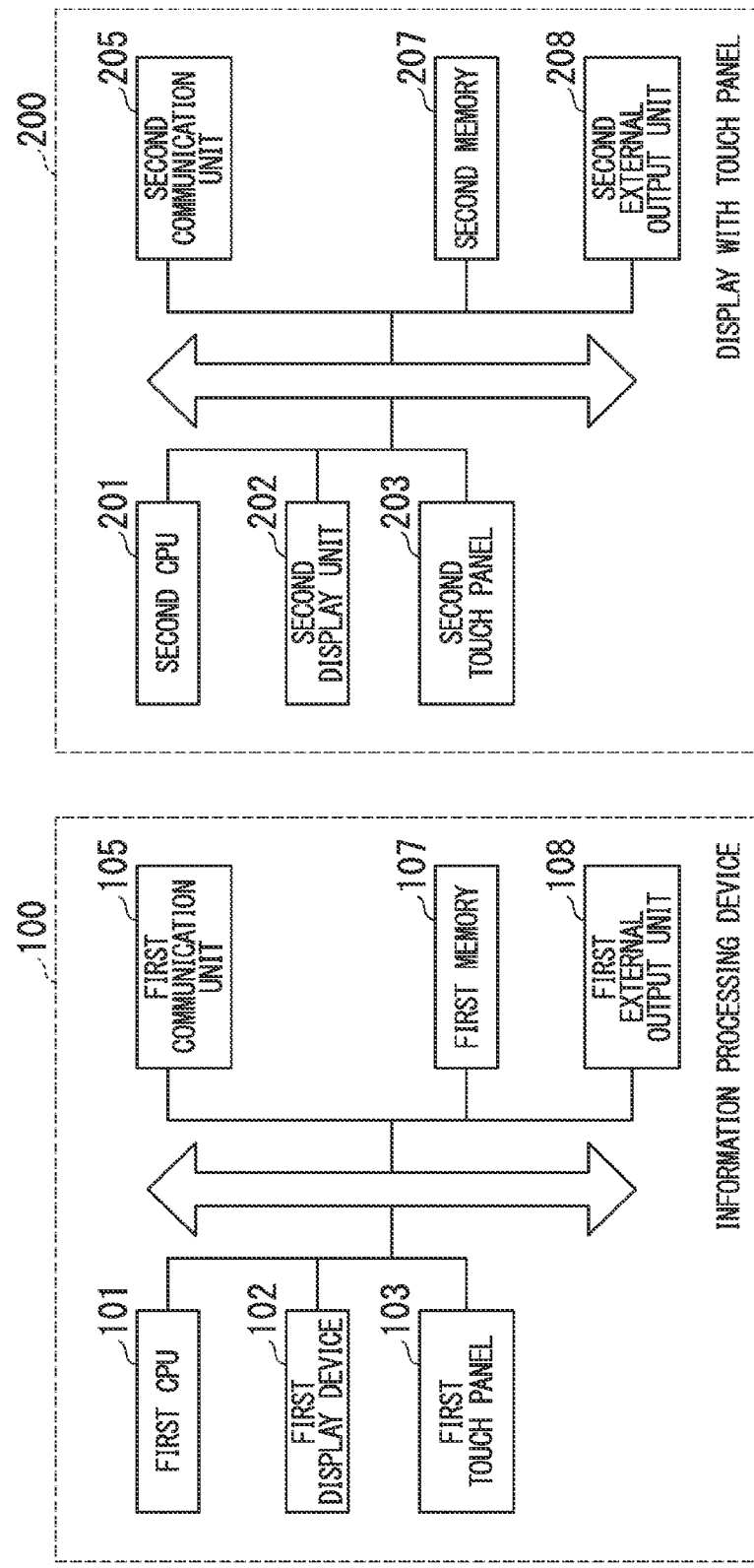
FIG. 2 is a simplified block diagram showing the hardware constitution of the information processing device 100 and a display with touch panel 200 in the first embodiment.

FIG. 2 is a simplified block diagram showing the hardware constitution of the information processing device 100 and the display with touch panel 200. As shown in FIG. 2, the information processing device 100 is constituted to include a first CPU 101, a first display unit 102, a first touch panel 103, a first communication unit 105, a first memory 107, and a first external output unit 108. The display with touch panel 200 is constituted to include a second CPU 201, a second display unit 202, a second touch panel 203, a second communication unit 205, a second memory 207, and a second external output unit 208.

The first touch panel 103 is installed onto the surface of the first display unit 102 and detects the position touched by a user (hereinafter "touch position"). The first display unit 102 has a display device such as a liquid crystal display and displays an image in accordance with an instruction from the first CPU 101.

The second touch panel 203 is installed onto the surface of the second display unit 202 and detects the touch position. The second display unit 202 has a display device such as a liquid crystal display and displays an image in accordance with an instruction from the second CPU 201. In this case, for example, the sizes or numbers of pixels (resolution) of the screens between the first display unit 102 and the second display unit 202 are different.

Figure 3:
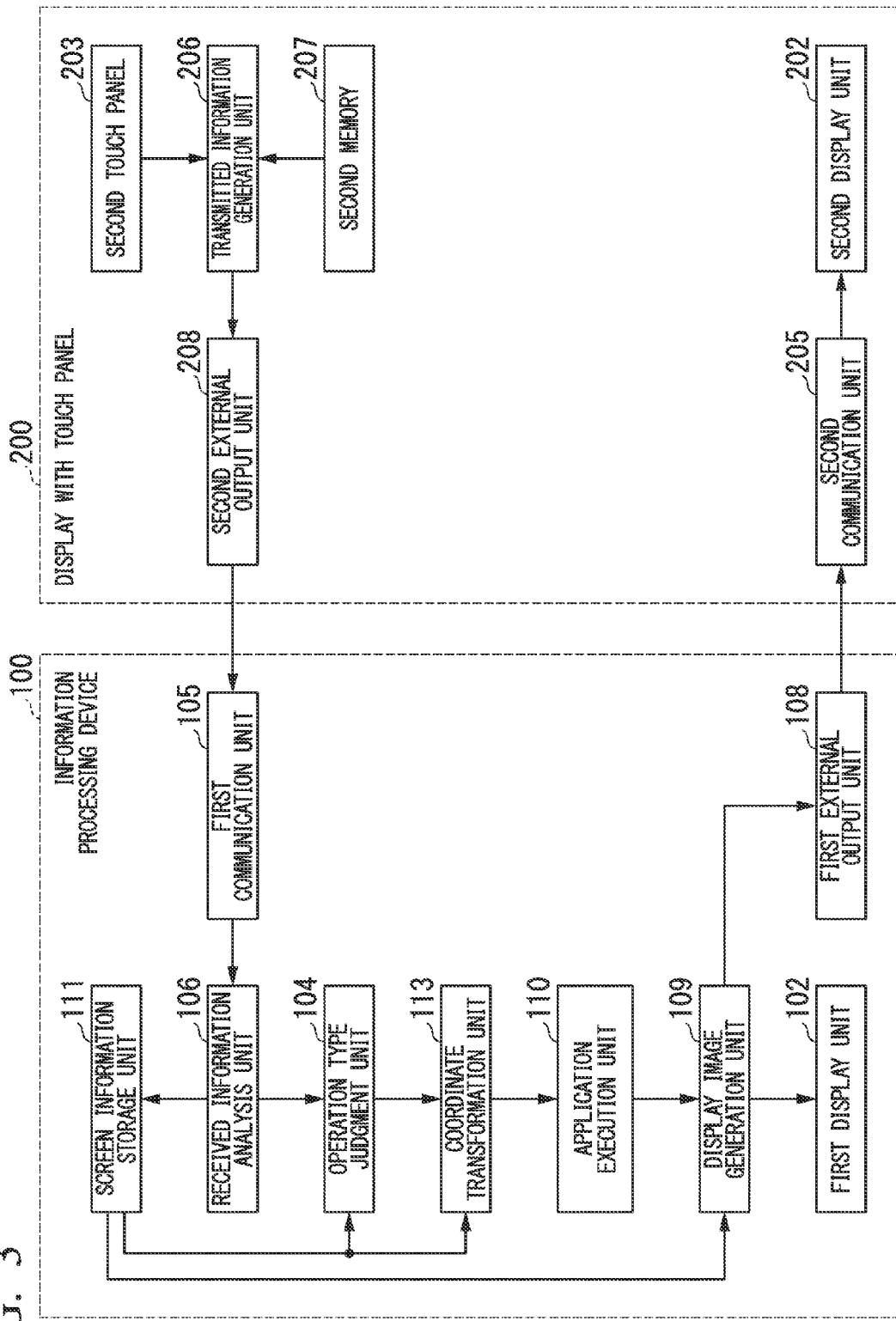
FIG. 3 is a simplified block diagram showing the functional constitution of the information processing device 100 and the display with touch panel 200 in the first embodiment.

FIG. 3 is a simplified block diagram showing the functional constitution of the information processing device 100 and the display with touch panel 200. The information processing device 100 is constituted to include the first communication unit 105, a first received information analysis unit 106, a screen information storage unit 111, an operation type judgment unit 104, a coordinate transformation unit 113, an application execution unit 110, a display image generation unit 109, the first display unit 102, and the first external output unit 108. The display with touch panel 200 is constituted to include the second display unit 202, the second touch panel 203, the second communication unit 205, a transmitted information generation unit 206, the second memory unit 207, and the second external output unit 208.

The operation type judgment unit 104, the coordinate transformation unit 113, the received information analysis unit 106, the screen information storage unit 111, the application execution unit 110, and the display image generation unit 109 are implemented by the first CPU 101 reading out and executing a program from the first memory 107. The transmitted information generation unit 206 is implemented by the second CPU 201 reading out and executing a program from the second memory 207.

In the same drawing, parts corresponding to ones in FIG. 2 are assigned the same reference numerals (102, 105, 108, 202, 203, 205, and 208), and the descriptions thereof will be omitted.

The first communication unit 105 communicates with the display with touch panel 200 via the cable 300 and receives information indicating the number of pixels per unit length on the screen and information indicating the touch position from the display with touch panel 200. In the present embodiment, the first communication unit 105 receives the size and number of pixels (resolution) of the screen (hereinafter "screen information") as the information indicating the number of pixels per unit length of the screen. The first communication unit 105 periodically receives from the display with touch panel 200 the touch position coordinates and the time at which the touch position coordinates were detected (hereinafter "coordinate detection time") as the information indicating the touch position.

When the display with touch panel 200 is not being touched, the first communication unit 105 receives null information as the touch position coordinates. In the present embodiment, the period of this notification is expressed as dt, in units of milliseconds.

The screen information storage unit 111 is a storage area operating as a working memory for execution of a program by the first CPU 101 and, when the display with touch panel 200 is connected, acquires and stores screen information from the received information analysis unit 106. The screen information storage unit 111 may acquire the screen information in dpi (dots per inch).

When the display with touch panel 200 is connected, the received information analysis unit 106 acquires screen information from the display with touch panel 200 via the first communication unit 105.

The received information analysis unit 106 periodically acquires information indicating the touch position on the display with touch panel 200 received periodically by the first communication unit 105. The received information analysis unit 106 judges whether the information acquired from the first communication unit 105 indicates the touch position or screen information and outputs the information, routing the information indicating the touch position to the operation type judgment unit 104 and screen information to screen information storage unit 111.

The operation type judgment unit 104 acquires information indicating the touch position and judges whether or not the touch position coordinates of information indicating the touch position are null information. If the touch position coordinates are not null information, the operation type judgment unit 104 generates and stores a touch operation table of the touch position coordinates and the coordinate detection time in the sequence of acquisition until the touch position coordinates will be acquired as null information. The details of the touch operation table will be described later. The operation type judgment unit 104 reads in screen information from the screen information storage unit 111. After acquiring the screen information, the operation type judgment unit 104 judges the type of touch operation, based on the screen information and the touch operation table. The details of the judgment of the touch operation type will be described later. After this, the operation type judgment unit 104 outputs information indicating the touch operation type and the touch operation table to the coordinate transformation unit 113.

When it acquires information indicating the touch operation type and the touch operation table, the coordinate transformation unit 113 reads in screen information from the screen information storage unit 111. The coordinate transformation unit 113, based on the screen information and the touch operation table, performs coordinate transformation of the coordinates of the touch position on the second touch panel 203 stored in the touch operation table to corresponding coordinates on the first touch panel 103 (hereinafter, "main unit coordinates"). The details of the coordinate transformation will be described later. The coordinate transformation unit 113 outputs information indicating the touch operation type and the main unit coordinates to the application execution unit 110 as touch operation information.

The application execution unit 110 executes an application such as a web browser. The application execution unit 110, based on the touch operation information acquired from the coordinate transformation unit 113, performs operations requested by the application being executed. For example, if the touch operation type is a flick from point A to point B, scrolling is done from point A to point B based on the flick. When the application being executed requests display of an image, the application execution unit 110 inputs image data of the image to the display image generation unit 109 in order to display the image on the first display unit 102 or the display with touch panel 200.

The display image generation unit 109 generates an image signal of the display image from image data of the application input from the application execution unit 110 and inputs the image signal to the first display unit 102 or the first external output unit 108.

The first external output unit 108 outputs the image signal of the display image input from the display image generation unit 109 to the second communication unit 205.

When it receives the image signal of the display image from the first external output unit 108, the second communication unit 205 inputs it to the second display unit 202.

When the display with touch panel 200 is connected, the transmitted information generation unit 206 acquires screen information from the second memory 207 and outputs the screen information to the second external output unit 208. When information indicating the touch position is acquired from the second touch panel 203, the transmitted information generation unit 206 outputs the information indicating the touch position to the second external output unit 208.

When it acquires the screen information, the second external output unit 208 inputs the screen information to the first communication unit 105. When it acquires information indicating the touch position, the second external output unit 208 inputs the information indicating the touch position to the first communication unit 105.

FIG. 4 is a table showing an example of the touch operation table for the case in which the display with touch panel 200 is tapped as a touch operation. The touch operation table t100t stores the coordinate detection times t101t and the touch position coordinates t102t. The touch position coordinates t102t, reflecting that the touch operation is a tap, do not indicate a change in the coordinate value even if the coordinate detection time t101t changes by an amount of the period dt.

FIG. 5 is a table showing an example of the touch operation table for the case in which the display with touch panel 200 is flicked as a touch operation. The touch operation table t100f stores the coordinate detection times t101f and the touch position coordinates t102f. The touch position coordinates t102f reflect that the touch operation is a flick, and each time the coordinate detection times t101f change by an amount of the period dt, the coordinate values also change.

Figure 6:
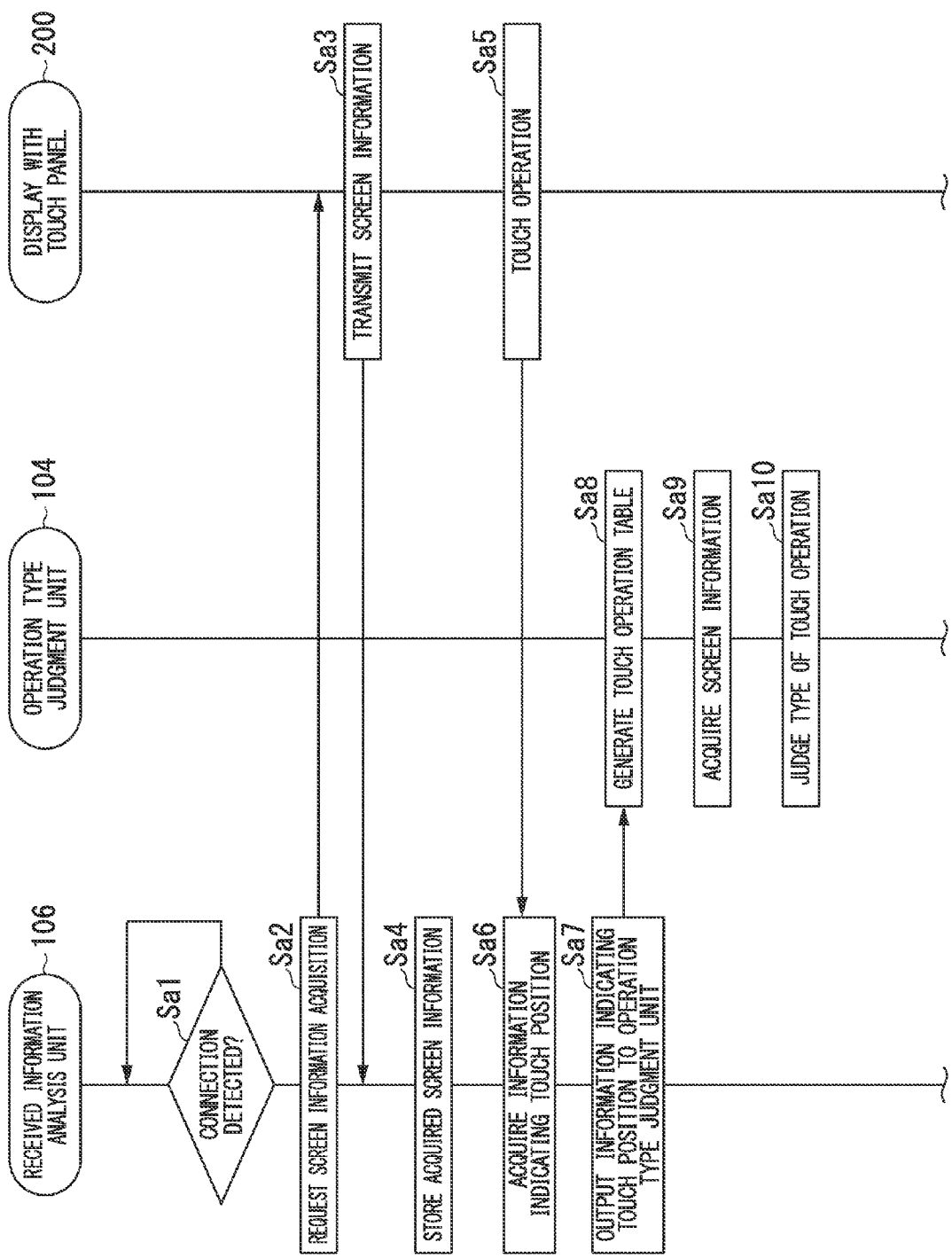
FIG. 6 is a sequence diagram showing the processing flow in a received information analysis unit, an operation type judgment unit, and the display with touch panel in the first embodiment.

FIG. 6 is a sequence diagram describing an operation example up until the judgment of the type of touch operation by the information processing device 100. First, the received information analysis unit 106 waits until detection of connection to the display with touch panel 200 (Sa1). When the connection of the display with touch panel 200 is detected, the received information analysis unit 106 requests screen information to the display with touch panel 200 via the first communication unit 105 (Sa2). When it receives the request, the display with touch panel 200 transmits its own screen information to the received information analysis unit 106 (Sa3). As a response to the request at Sa2, the received information analysis unit 106 acquires the screen information and stores it in the screen information storage unit 111 (Sa4).

Time elapses and, when a touch operation is received, the display with touch panel 200 outputs information indicating the touch position of the touch operation to the received information analysis unit 106 (Sa5). The received information analysis unit 106 acquires information indicating the touch position from the display with touch panel 200 (Sa6). The received information analysis unit 106 outputs information indicating the touch position to the operation type judgment unit 104 (Sa7). The operation type judgment unit 104, based on information indicating the touch position, generates a touch operation table (Sa8). The operation type judgment unit 104 acquires screen information from the screen information storage unit 111 (Sa9). The operation type judgment unit 104, based on the screen information and the touch operation table, judges the type of the touch operation (Sa10).

Figure 7:
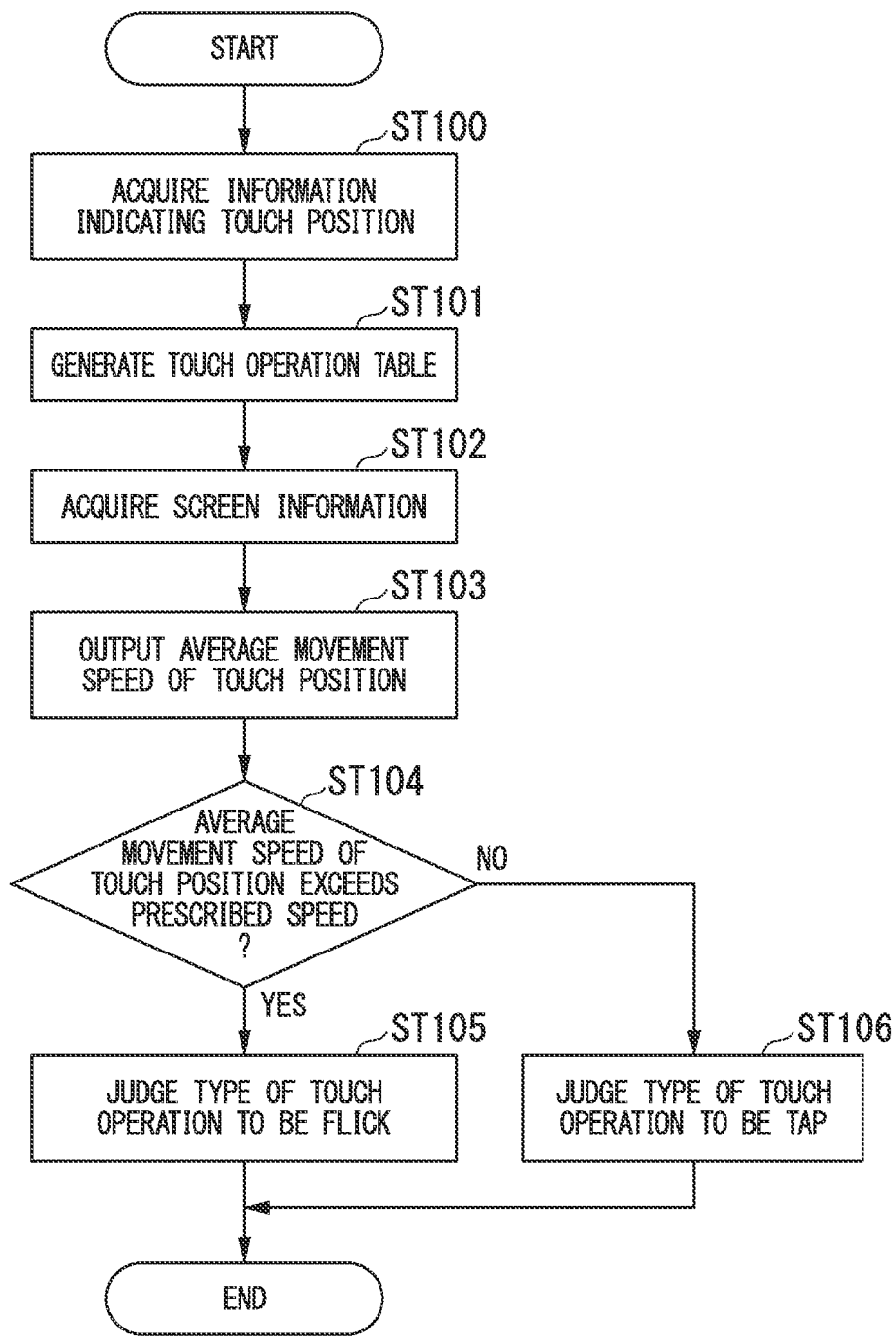
FIG. 7 is a drawing describing the operation of the operation type judgment unit in the first embodiment.

FIG. 7 is a flowchart describing the operation of judging the type of touch operation by the operation type judgment unit 104. For each touch operation of the display with touch panel 200, the operation type judgment unit 104 executes the processing from step ST100 to step ST106.

(Step ST100) The operation type judgment unit 104 acquires information indicating the touch position.

(Step ST101) Next, the operation type judgment unit 104, based on the information indicating the touch position, generates a touch operation table.

(Step ST102) Next, the operation type judgment unit 104 acquires the screen information. The processing to acquire the screen information is not necessary each time information indicating the touch position is acquired, and the screen information may be acquired at only the first time the touch position information is acquired.

(Step ST103) Next, the operation type judgment unit 104 references the touch operation table and calculates the average speed of movement from the user touching to the user releasing of the second touch panel 203 (a value representing the amount of movement of the touch position). At this point, the details of calculating the average speed of movement will be described with reference being made to the touch operation table t100f of FIG. 5. Because the touch operation table t100f has four sets of coordinates, these will be called, from top to bottom, point A, point B, point C, and point D. Point A is the position at which the user touched the second touch panel 203, and point D is the position at which the user released the touch from the second touch panel 203.

The operation type judgment unit 104 first, using the screen information, calculates the distance between point A and point B.

If the screen information is a screen size of horizontally D60x×vertically D60y and the number of pixels of the second touch panel 203 is horizontally TR60x×vertically TR60y, the distance between point A and point B in an full-dimension size, using the Pythagorean Theorem, is the distance between A and B, which can be calculated as $\sqrt{((dx\_2-dx\_1) \times D60x/TR60x)^2 + ((dy\_2-dy\_1) \times D60y/TR60y)^2}$).

In the present embodiment, although the operation type judgment unit 104 repeats this operation between point B and point C and point C and point D, and adds the calculated distance between A and B, between point B and C and between point C and point D to determine the touch position movement distance, this is not a restriction. For example, the straight-line distance between the coordinates representing the touch positions stored on the uppermost record and the lowermost record of the touch operation table, that is, the straight-line distance between point A and point D in the example of the touch operation table t100f may be calculated as the movement distance.

At this point, consider the case in which the movement distance from point A to point D is 3 cm. The operation type judgment unit 104 can calculate the time required by the movement from point A to point D by referencing the coordinate detection times t101f. In the case of the touch operation table t100f, the time required for movement is 3dt. In the present embodiment, if the detection period dt is 33 ms, 3dt would be 99 ms. Thus, the average movement speed when the coordinates move from point A to point D would be approximately 0.3 m/s, since the movement is 3 cm in 99 ms.

(Step ST104) Next, the operation type judgment unit 104 judges whether or not the average movement speed exceeds a prescribed threshold. Because this judgment is made using the average movement speed in the actual dimension size of the coordinates of the touch position, the type of touch operation can be judged using the same threshold among the displays with touch panels of different sizes. Therefore, the operational feeling of a touch operation on the display with touch panel 200 is the same as the operational feeling of a touch operation on the information processing device 100. Although, in the present embodiment, the judgment is made by a comparison between the average movement speed and a prescribed threshold, this is not a restriction. For example, the judgment may be made using the moved distance during a prescribed time interval as an average movement speed, so that the judgment is whether the moved distance per 99 ms exceeds a prescribed threshold.

If the average movement speed exceeds a prescribed threshold (Yes at step ST104), the operation type judgment unit 104 proceeds to step ST105. If the average movement speed did not exceed the prescribed threshold (No at step ST104), the operation type judgment unit 104 proceeds to step ST106.

(Step ST105) The operation type judgment unit 104 judges the type of the touch operation to be a flick.

(Step ST106) The operation type judgment unit 104 judges the type of the touch operation to be a tap.

Although the judge of the type of touch operation in the present embodiment has been described with regard to a tap and a flick only, this is not a restriction. For example, in the case of multi-tap events such as pinching in and pinching out, judgment may be made of the different from a tap or flick by whether or not there is a plurality of detected coordinates, with a judgment being made as to whether or not the operation was a pinch in or a pinch out by whether or not the touch position movement distance determined at step ST103 exceeds a prescribed threshold.

In this manner, the operation type judgment unit 104 of the information processing device 100 judges the type of a touch operation made on the display with touch panel 200 based on the screen information of the second display unit 202 of the display with touch panel 200. For this reason, the information processing device 100 can judge the type of a touch operation in accordance with the number of pixels per unit length indicated by the screen information and can properly judge the type of touch operation with respect to the display with touch panel 200.

The information processing device 100 has a first touch panel 103. Additionally, the operation type judgment unit 104, based on information indicating the touch position of a touch operation on the display with touch panel 200 connected to the information processing device 100 and on screen information, calculates the average movement speed as a value representing the amount of movement of the touch position. The operation type judgment unit 104 judges the type of the touch operation by whether or not the average movement speed exceeds a prescribed threshold. The prescribed threshold is the same as the threshold used when the information processing device 100 judges the type of a touch operation made with respect to the first touch panel 103.

For example, the information processing device 100 judges the type of a touch operation using the average movement speed in the actual dimension size of the touch position, based on the screen information. The result of doing this is that the same touch operation type is judged when the same operation in an actual dimension size touch operation is made on the information processing device 100 and the display with touch panel 200 or on displays with touch panel 200 having different sizes. For this reason, the user can experience a touch operation on the display with touch panel 200 with the same operational feel as a touch operation on the information processing device 100.

As described in the foregoing example, the information processing device 100 can make a judgment suited to the size of the display with touch panel 200 and can make a proper judgment of the type of touch operation.

Second Embodiment

The information processing device 100 in the second embodiment does not include the operation type judgment unit 104, but includes the operation type judgment unit 104 in the functional constitution of the display with touch panel 200.

Figure 8:
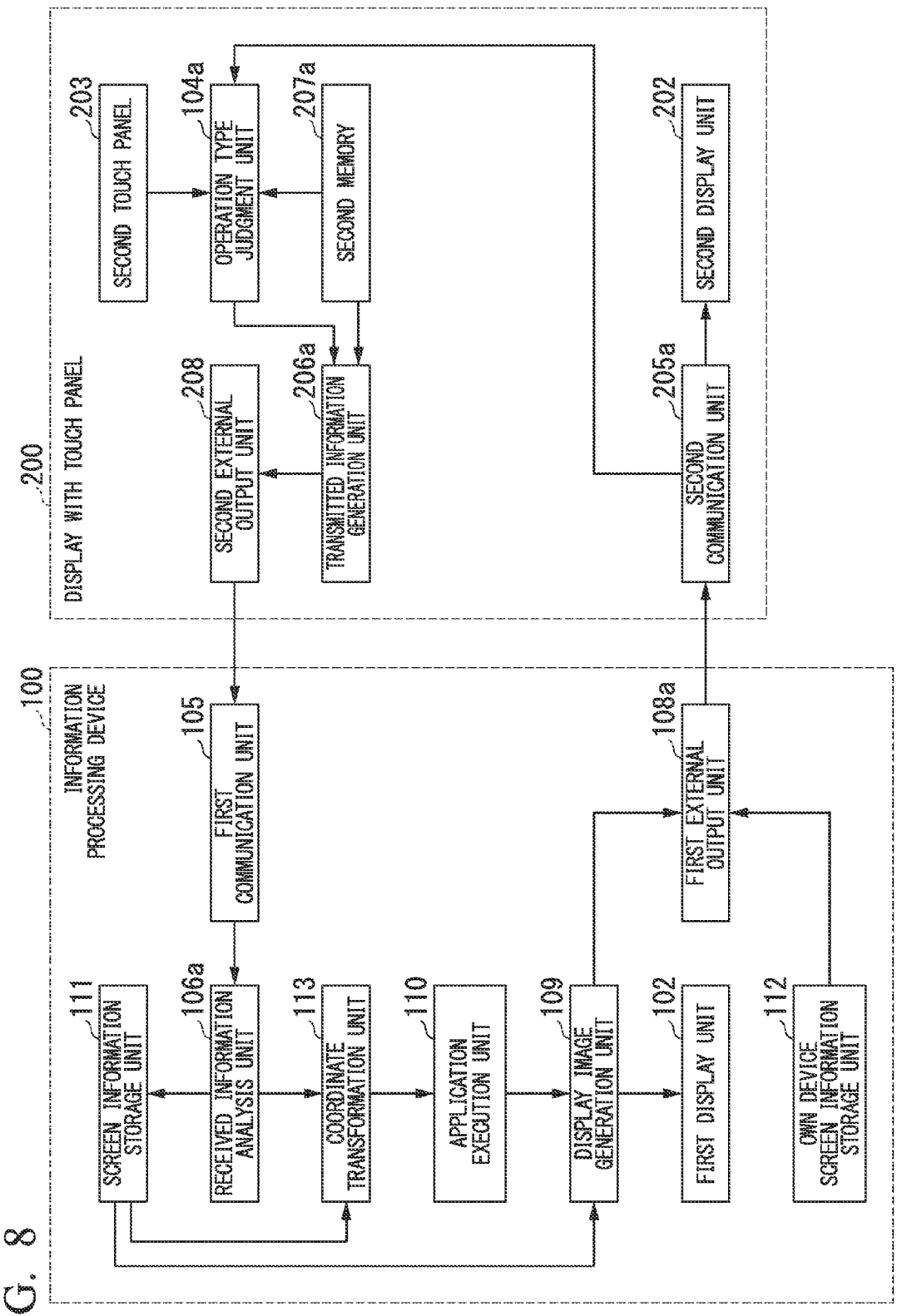
FIG. 8 is a simplified block diagram showing the functional constitution of the information processing device 100 and the display with touch panel 200 in a second embodiment.

FIG. 8 is a simplified block diagram showing the functional constitution of the information processing device 100 and the display with touch panel 200 in the second embodiment. In this drawing, parts that are the same as those in FIG. 3 are assigned the same reference numerals, and the descriptions thereof will be omitted.

The operation type judgment unit 104a periodically reads in information indicating the touch position from the second touch panel 203. The operation type judgment unit 104a judges whether or not the coordinates of the touch position in the information indicating the touch position are null information. If the touch position coordinates are not null information, the operation type judgment unit 104a generates and stores a touch operation table of the touch position coordinates and the coordinate detection time in the sequence of acquisition until the touch position coordinates are acquired as null information.

The operation type judgment unit 104a acquires, via the second communication unit 205a, screen information of the information processing device 100 (hereinafter "the own device screen information") stored in the own device screen information storage unit 112. The operation type judgment unit 104a acquires screen information from the second memory 207a. The operation type judgment unit 104a, based on the screen information and the touch operation table, judges the type of the touch operation. After that, the operation type judgment unit 104a outputs the touch operation table and information indicating the touch operation type to the transmitted information generation unit 206a.

When the transmitted information generation unit 206a acquires the touch operation table and information indicating the touch operation type from the operation type judgment unit 104a, it outputs the touch operation table and the information indicating the touch operation type to the received information analysis unit 106a, via the second external output unit 208. When the display with touch panel 200 is connected to the information processing device 100, the transmitted information generation unit 206a reads in screen information from the second memory 207a and, via the second external output unit 208, outputs the screen information to the received information analysis unit 106a.

The own device screen information storage unit 112 is a storage area operating as a working memory for execution of a program by the first CPU 101 and stores the own device screen information. The own device screen information storage unit 112, in accordance with a request from the operation type judgment unit 104a, outputs the own device screen information to the operation type judgment unit 104a via the first external output unit 108a.

When it acquires the own device screen information from the own device screen information storage unit 112, the first external output unit 108a outputs the own device screen information to the second communication unit 205a.

When the second communication unit 205a acquires the own device screen information from the first external output unit 108a, it outputs the own device screen information to the operation type judgment unit 104a.

In this manner, the operation type judgment unit 104a judges the type of the touch operation, based on the number of pixels per unit length indicated by screen information of the display with touch panel 200 and information indicating the touch position at which the display with touch panel 200 was touched. The operation type judgment unit 104a outputs information indicating the touch operation type to the information processing device 100. For this reason, even if the information processing device 100 does not have a function corresponding to the operation type judgment unit 104, by the display with touch panel 200 having the function of the operation type judgment unit 104, the same effect is achieved as with the first embodiment.

Third Embodiment

When the display with touch panel 200 is connected, the received information analysis unit 106 in the third embodiment acquires from the display with touch panel 200, via the first communication unit 105, either information VendorID/ProductID capable of identifying the model of the display with touch panel 200 or information capable of individual identification, such as the MAC address. The received information analysis unit 106 stores the information capable of identifying the model or capable of individual identification and the screen information, in association with one another beforehand, and takes the screen information associated with the information acquired from the display with touch panel 200 as being the screen information of the connected display with touch panel 200.

If, there is no stored screen information associated with the information capable of identifying the model or information capable of individual identification acquired from the display with touch panel 200, the received information analysis unit 106 may acquire screen information by any one of the following methods 1) to 3). 1) The received information analysis unit 106, via the first communication unit 105, acquires screen information corresponding to information acquired from the display with touch panel 200 in accordance with a request to an external device such as a server connected to the Internet.

2) The received information analysis unit 106 displays on the first display unit 102 a screen to which the user will be caused to input screen information, and screen information input by the user is acquired. The screen to which the user is made to input screen information may have, for example, an input box into which a number is input regarding the number of pixels, or a pull-down menu or radio buttons enabling selection from a plurality of candidates. 3) The received information analysis unit 106 displays on the first display unit 102 a screen from which the user is made to select one type from a plurality of screen information types previously stored and uses the screen information selected by the user.

The received information analysis unit 106 associates the screen information acquired by the above-noted methods with information capable of identifying the model or information capable of individual identification acquired from the display with touch panel 200 and stores these in the screen information stored unit 111. This enables the use of the screen information when the same display with touch panel 200 is connected.

Fourth Embodiment

When the display with touch panel 200 is connected, the received information analysis unit 106 in the fourth embodiment takes pre-established screen information as being the screen information to use. The pre-established screen information may be screen information selected beforehand by the user from a plurality of screen information stored by the screen information storage unit 111. When the display with touch panel 200 is connected, the plurality of screen information stored beforehand may be displayed on the first display unit 102, the user selecting from thereamong.

Although in each of the above-described embodiments the description has been for the case of the information processing device 100 having a first touch panel 103 and a first display unit 102, the information processing device 100 may have either one or both thereof.

Also, of the screen information, the number of pixels and the screen size may be acquired by different methods, for example the number of pixels being acquired from the display with touch panel 200 and the screen size having been stored in association with information capable of individual identification.

In each of the above-described embodiments, the information processing device 100 or the display with touch panel 200 is an apparatus capable of judging the type of operation based on information representing the number of pixels per unit length of the screen of the display with touch panel 200 connected to the information processing device 100 having the first display unit 102 and information identifying an operation position in the display of the image generator by the information processing device 100. In this case, the operation may be not limited to a touch operation, and may include an operation of a pointing device (for example, a mouse or touch pad) other than a touch panel. For example, the operation type judgment unit 104 may use the average movement speed of a cursor by a pointing device as the above-noted average movement speed.

The information processing device 100 may be implemented by recording a program for implementing all or part of the functions of the information processing device 100 shown in FIG. 3 into a computer-readable recording medium and having a computer system read and execute the program recorded in the recording medium. The term "computer system" used here includes an operating system and hardware such as peripheral devices.

The term "computer system" may encompass a web page providing environment (or display environment) if the WWW system is utilized.

The term "computer-readable recording medium" refers to a removable medium such as a flexible disk, an optomagnetic disk, a ROM, a CD-ROM, or to a storage device such as a hard disk built into a computer system.

Additionally, the term "computer-readable recording medium" may encompass one holding a program over a short time dynamically such as a communication line in the case in which a program is transmitted via a network such as the Internet or via a communication line such as a telephone line and one in such cases in which a program is held for a given period of time as a volatile memory within a computer system serving as a server or client. The above-noted program may be for implementing a part of the above-described functions and may further be one enabling implementation by combination with a program that already has recorded the above-noted functionality in a computer system.

Although the foregoing has been a description of embodiments of the present invention referring to drawings, the specific constitution is not limited to the embodiments, and may include various design modifications, within the scope of the spirit of the invention.

(1) One aspect of the present invention is an information processing device characterized by including: an operation type judgment unit that judges a type of touch operation, based on information representing a number of pixels per unit length of a screen of a display with a touch panel connected to an own device and on information indicating a touch position at which the display with the touch panel was touched.

(2) Another aspect of the present invention is the information processing device noted in (1) characterized by including: a display with a touch panel, wherein the operation type judgment unit calculates a value representing an amount of movement of the touch position based on the information representing the number of pixels and on the information indicating the touch position at which the display with the touch panel connected to the own device was touched, and makes the judgment by whether or not a value representing the amount of movement exceeds a prescribed threshold, and wherein the prescribed threshold is the same threshold as used in a case of judging the type of touch operation made with respect to a display with a touch panel of the own device.

(3) Another aspect of the present invention is a display device with touch panel to which an information processing device is connected, characterized by including an operation type judgment unit that judges a type of touch operation, based on information representing the number of pixels per unit length of the screen of an own device and on information indicating the touch position at which the own device was touched, and an external output unit that outputs, to the information processing device, information indicating the type of touch operation.

(4) In the information processing device noted in (1), it is characterized that the type of touch operation includes at least one of tap, flick, pinch in, and pinch out.

(5) Another aspect of the present invention is an information processing method of an information processing device, the information processing method characterized by including: a step of calculating a value representing an amount of movement of the touch position, based on information representing a number of pixels per unit length of a screen of a display with a touch panel connected to an own device and on information indicating a touch position at which the display with the touch panel was touched; and judging a type of touch operation using the value.

(6) Another aspect of the present invention is a program for causing a computer to function as an information processing device of any one of (1) to (3).

INDUSTRIAL APPLICABILITY

The present invention is preferable for, but not restricted to, use when an external display device is connected to an information processing device.

DESCRIPTION OF REFERENCE SYMBOLS

100 . . . Information processing device, 101 . . . First CPU 102 . . . First display unit, 103 . . . First touch panel, 104 . . . Operation type judgment unit, 105 . . . First communication unit, 106 . . . Received information analysis unit, 107 . . . First memory, 108 . . . First external output unit, 109 . . . Display image generation unit, 110 . . . Application execution unit, 111 . . . Screen information storage unit, 112 . . . Own device screen information storage unit, 113 . . . Coordinate transformation unit, 200 . . . Display with touch panel, 201 . . . Second CPU, 202 . . . Second display unit, 203 . . . Second touch panel, 205 . . . Second communication unit, 206 . . . Transmitted information generation unit

The invention claimed is:
1. An information processing device comprising:
a first display with a first touch panel; and
an operation type judgment unit configured to judge a first type of first touch operation, the judgement of the first type being made based on first information and second information, the first information representing a number of pixels per unit length of a screen of a second display with a second touch panel, the second display being connected to the information processing device, the second information indicating a touch position at which the first touch operation was made to the second touch panel, the judgement of the first type being made by calculating a value and by judging whether or not the value exceeds a first prescribed threshold, the value representing an amount of movement of the touch position,
wherein the first prescribed threshold is the same as a second prescribed threshold, the second prescribed threshold being used in a case of judging a second type of second touch operation which was made to the first touch panel.
2. The information processing device according to claim 1,
wherein the first type includes at least one of tap, flick, pinch in, and pinch out.
3. An information processing method of an information processing device, the information processing device comprising a first display with a first touch panel, the information processing method comprising:
judging a first type of first touch operation, the judgement of the first type being made based on first information and second information, the first information representing a number of pixels per unit length of a screen of a second display with a second touch panel, the second display being connected to the information processing device, the second information indicating a touch position at which the first touch operation was made to the second touch panel, the judgement of the first type being made by calculating a value and by judging whether or not the value exceeds a first prescribed threshold, the value representing an amount of movement of the touch position, wherein the first prescribed threshold is the same as a second prescribed threshold, the second prescribed threshold being used in a case of judging a second type of second touch operation which was made to the first touch panel.

4. A non-transitory computer-readable recording medium in which a program is recorded, the program causing a computer of an information processing device comprising a first display and a first touch panel to perform:

judging a first type of first touch operation, the judgement of the first type being made based on first information and second information, the first information representing a number of pixels per unit length of a screen of a second display with a second touch panel, the second display being connected to the information processing device, the second information indicating a touch position at which the first touch operation was made to the second touch panel, the judgement of the first type being made by calculating a value and by judging whether or not the value exceeds a first prescribed threshold, the value representing an amount of movement of the touch position, wherein the first prescribed threshold is the same as a second prescribed threshold, the second prescribed threshold being used in a case of judging a second type of second touch operation which was made to the first touch panel.

* * * * *